No. 738,942. PATENTED SEPT. 15, 1903.
F. A. REDMON.
STORAGE BATTERY.
APPLICATION FILED MAR. 16, 1903.
NO MODEL.
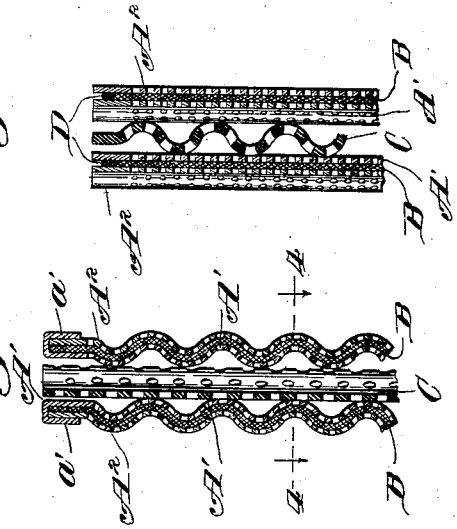
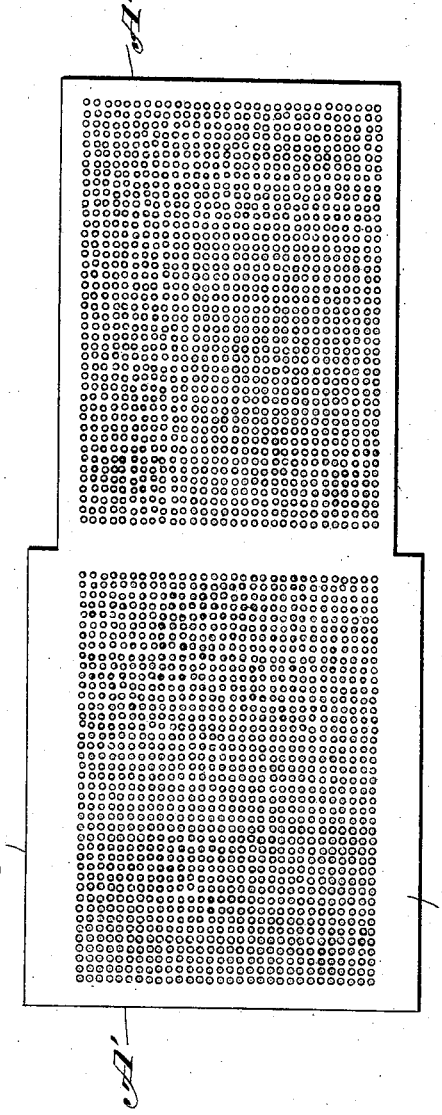
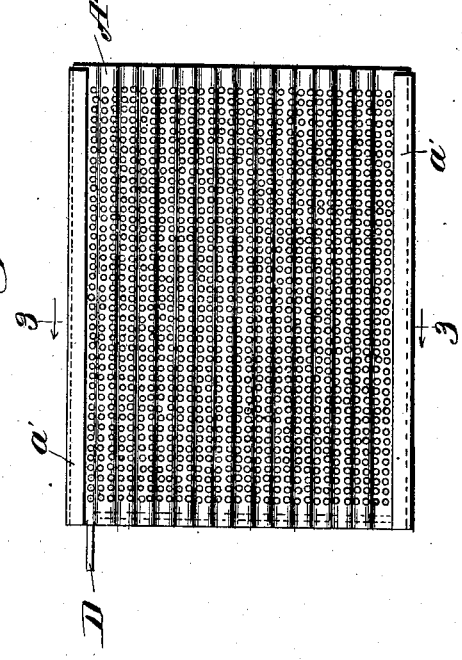
Witnesses:
H. S. Gaither.
C. C. Cunningham
Inventor:
Frederick A. Redmon
by Chamberlin & Wilkinson
Attorneys
THE NORRIS PETERS CO., PHOTO-LITHO., WASHINGTON, D. C.

No. 738,942. Patented September 15, 1903.

UNITED STATES PATENT OFFICE.

FREDERICK A. REDMON, OF CHICAGO, ILLINOIS, ASSIGNOR OF ONE-HALF TO ALBERT W. HOLMES, OF CHICAGO, ILLINOIS.

STORAGE BATTERY.

SPECIFICATION forming part of Letters Patent No. 738,942, dated September 15, 1903.

Application filed March 16, 1903. Serial No. 147,956. (No model.)

*To all whom it may concern:*

Be it known that I, FREDERICK A. REDMON, a citizen of the United States, residing at Chicago, county of Cook, State of Illinois, have invented a certain new and useful Improvement in Storage Batteries; and I declare the following to be a full, clear, and exact description of the invention, such as will enable others skilled in the art to which it pertains to make and use the same, reference being had to the accompanying drawings, which form a part of this specification.

My invention relates in general to secondary or storage batteries, and more particularly to means for supporting the active material.

One of the principal difficulties incident to the manufacture and use of storage batteries is to so support the active material upon the plates that it will be sufficiently firmly secured thereto as not to drop off and at the same time be freely exposed to the action of the surrounding fluid.

The primary object of my invention is to provide a plate for storage batteries in which the active material will be firmly and securely supported and which will be light in weight and at the same time possess structural strength.

A still further object of my invention is to provide a plate for storage batteries which will be simple in construction, inexpensive in manufacture, efficient in operation, and durable in use.

The embodiment of my invention herein disclosed consists, generally described, in a corrugated perforated metallic envelop which surrounds an absorbent substance containing the active material.

My invention will be more fully described hereinafter with reference to the accompanying drawings, in which the same is illustrated in a convenient and practical form, and in which—

Figure 1 is a plan view of a perforated blank from which the metallic envelop is made; Fig. 2, a plan view of the complete plate; Fig. 3, a detail sectional view, on an enlarged scale, taken on line 3 3, Fig. 2; and Fig. 4, a sectional detail view taken on line 4 4, Fig. 3.

The same reference characters are used to designate the same parts in the several figures of the drawings.

In carrying out my invention a perforated blank, such as shown in Fig. 1, is provided, consisting in two portions $A'$ and $A^2$, united by an unperforated part. The portion $A'$ is sufficiently wider than the part $A^2$ to form laterally-projecting flanges $a'$ $a'$. The active material, of any preferred composition, is spread upon an absorbent substance—such, for instance, as burlap, matting, or other fibrous fabric. The absorbent substance containing the active material is then placed upon one of the portions of the blank and the other portion folded over the absorbent so as to inclose the same within the two portions of the blank. The side flanges $a'$ $a'$ are then folded over the edges of the portion $A^2$, so as to retain the same in close proximity to the opposing surface of the other portion $A'$, the absorbent being thereby retained between the two portions of the blank. The blank when so folded around the absorbent is inserted between dies or any suitable form of press, and thereby compressed so as to securely retain the absorbent substance within the blank, which constitutes an inclosing envelop. Corrugations are also formed, preferably at the same operation which compresses the parts of the envelop together, which increase the structural strength of the finished plate. Prior to subjecting the plate to compression a wire D is located between the edges of the two portions $A'$ and $A^2$ thereof, which constitutes a conductor for electrically uniting the plate to the other plates constituting the cell or element.

By referring particularly to Figs. 3 and 4 it will be seen that the absorbent substance B is closely confined between the two portions $A'$ and $A^2$ of the surrounding metallic envelop, the perforations in the envelop permitting the fluid surrounding the plates to engage the active material carried by the absorbent.

Any desired number of plates constructed as above described may be assembled to form an element in a manner well known in the art. The adjacent plates are preferably spaced apart by a separator C, which is preferably in the form of a perforated sheet of rigid insulating material corrugated transversely with respect to the corrugations formed in the plates. The corrugations in the plates impart to them rigidity in the direction of their height, while the corrugations in the separators impart strength to the united plates constituting an element in a transverse direction.

From the foregoing description it will be observed that I have invented an improved plate for storage batteries in which the active material is securely supported by the plate and at the same time freely accessible to the surrounding fluid and which possesses individual structural strength and when united with other plates to form an element with the interposed corrugated separators results in a structurally strong and electrically efficient battery.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention.

Having now fully described my invention, what I claim as new, and desire to secure by Letters Patent, is—

1. In a plate for storage batteries, the combination with a perforated metallic envelop, of absorbent substance inclosed in said envelop, and active material carried by said absorbent substance.

2. In a plate for storage batteries, the combination with a perforated corrugated metallic envelop, of a fibrous absorbent substance inclosed within said envelop, and active material carried by said absorbent substance.

3. In a plate for storage batteries, the combination with a perforated metallic envelop, of absorbent substance inclosed within said envelop, active material carried by said absorbent substance, and a conductor lying between and engaging the walls of said envelop.

4. In a storage battery, the combination with a plurality of corrugated plates, of active material supported by said plates, separators interposed between adjacent plates and having corrugations extending transversely to the corrugations of the plates.

5. In a plate for storage batteries, the combination with a corrugated perforated metallic envelop, of absorbent substance inclosed within said envelop, active material carried by said absorbent substance and a conductor running between and engaged by the walls of said envelop and extending transversely to the corrugations whereby the conductor is firmly secured to the plate.

6. In a storage battery, the combination with a plurality of plates each plate comprising a corrugated perforated metallic envelop inclosing an absorbent substance which carries the active material, of rigid corrugated perforated separators interposed between adjacent plates the corrugations of which extend transversely to the corrugations of the plates, whereby passage-ways are formed for the free circulation of the fluid between the adjacent plates.

In testimony whereof I sign this specification in the presence of two witnesses.

FREDERICK A. REDMON.

Witnesses:
GEO. L. WILKINSON,
CLARA C. CUNNINGHAM.